S. ROTH.
SUBMARINE RESCUING APPARATUS.
APPLICATION FILED JUNE 14, 1911.
1,026,458.
Patented May 14, 1912.
3 SHEETS—SHEET 1.
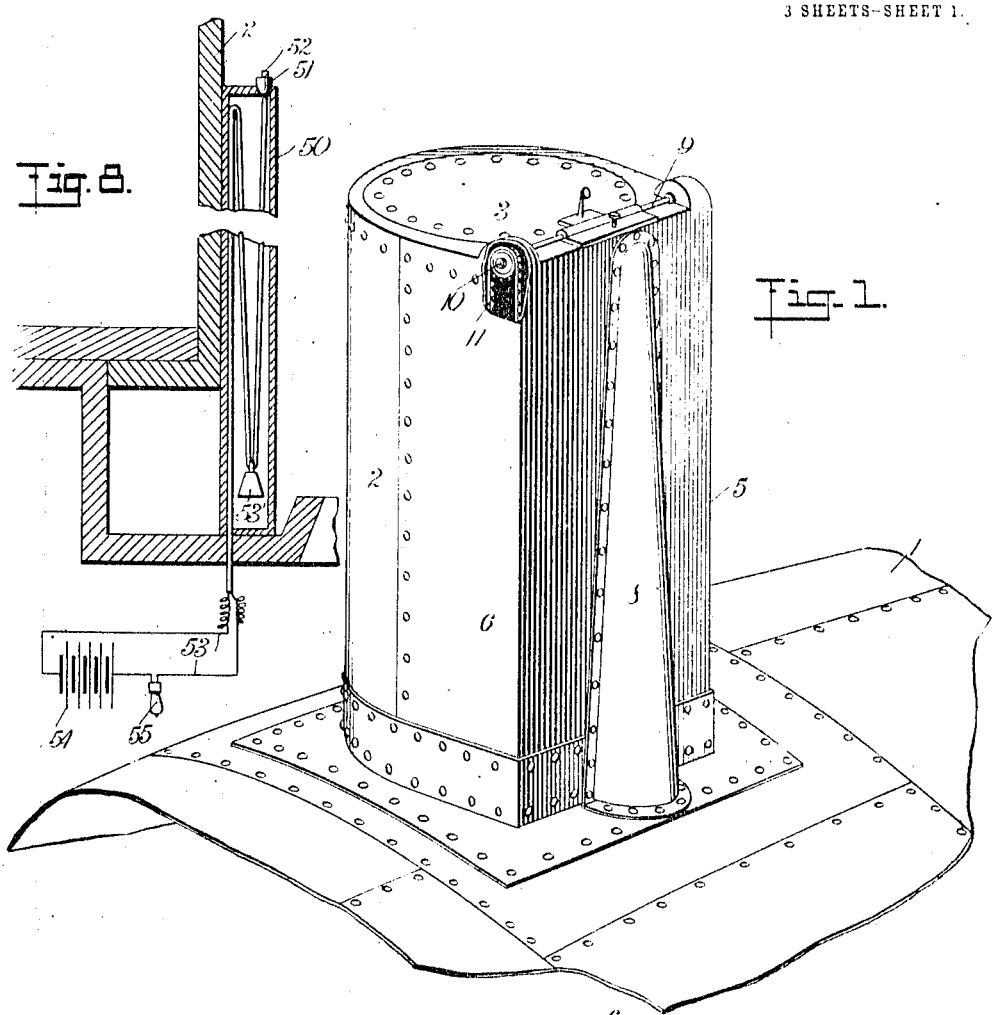
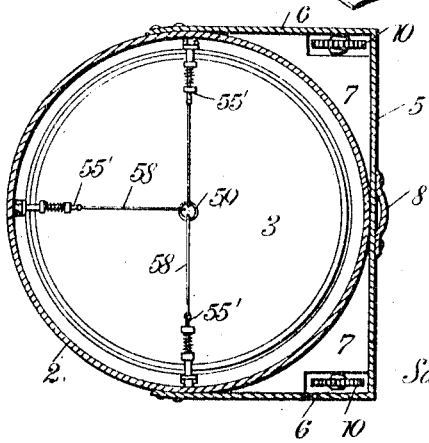
WITNESSES
INVENTOR
Samuel Roth
BY Munn & Co.
ATTORNEYS

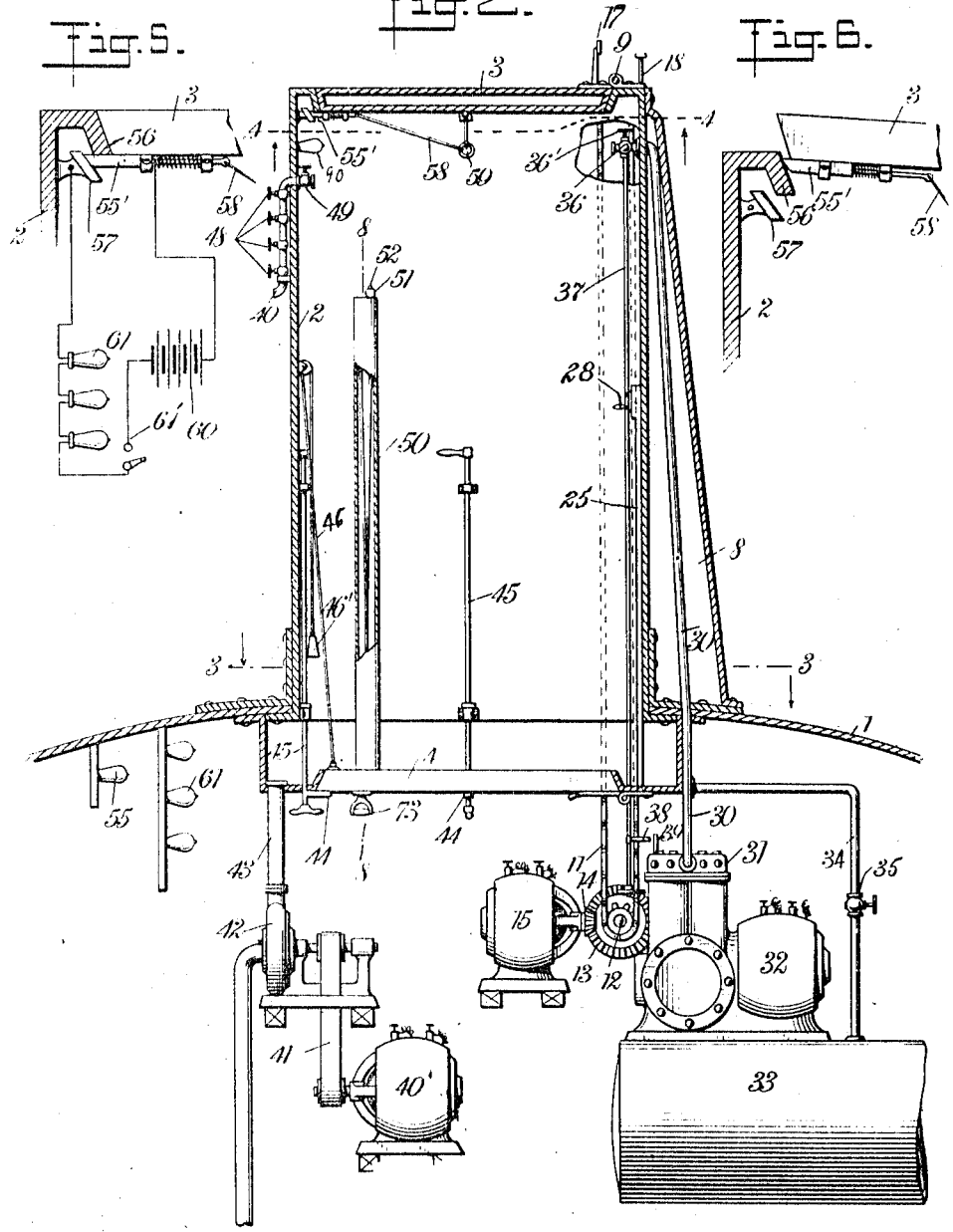

S. ROTH.
SUBMARINE RESCUING APPARATUS.
APPLICATION FILED JUNE 14, 1911.
1,026,458.
Patented May 14, 1912.
3 SHEETS—SHEET 3.
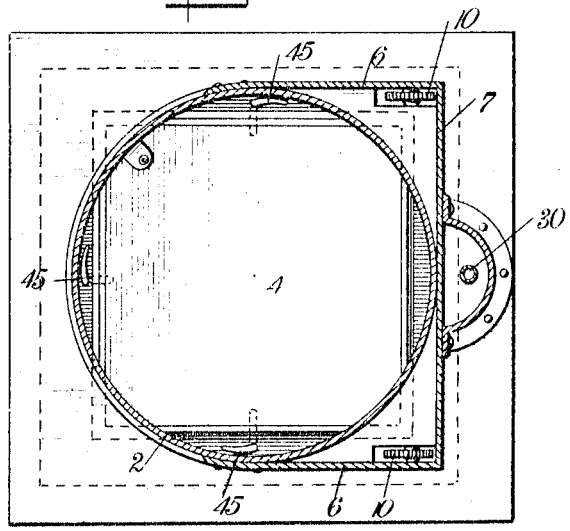
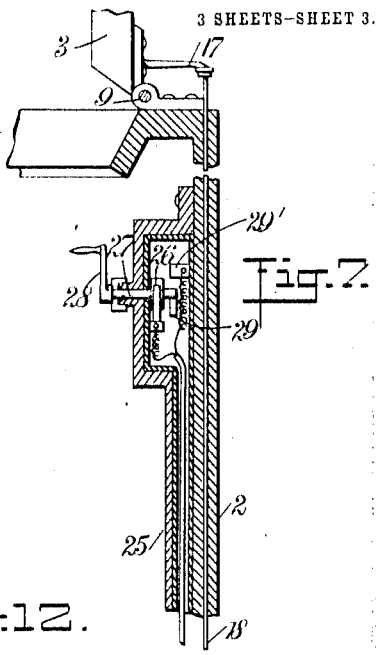
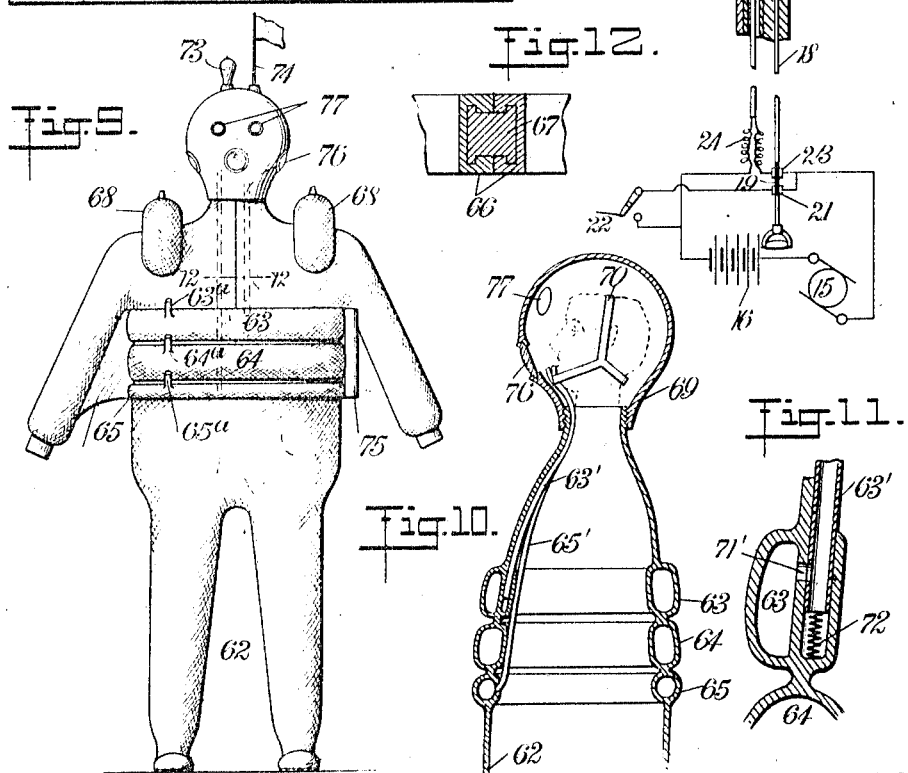
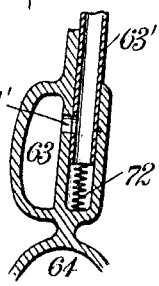
WITNESSES
INVENTOR
Samuel Roth
BY Munn Co.
ATTORNEYS

UNITED STATES PATENT OFFICE.

SAMUEL ROTH, OF NEW YORK, N. Y., ASSIGNOR TO PIETER TREFFERS, OF BROOKLYN, NEW YORK.

SUBMARINE RESCUING APPARATUS.

1,026,458.  Specification of Letters Patent.  Patented May 14, 1912.

Application filed June 14, 1911. Serial No. 633,020.

*To all whom it may concern:*

Be it known that I, SAMUEL ROTH, a citizen of the United States, and a resident of the city of New York, borough of Manhattan, in the county and State of New York, have invented a new and Improved Submarine Rescuing Apparatus, of which the following is a full, clear, and exact description.

My invention relates to certain new and useful improvements in rescuing apparatus to be carried by submarine boats, for the purpose of rescuing the crew thereof, and especially the last man of the crew, from the hull of the submarine in case of accident.

My invention comprises a casing which is secured to the hull of the submarine, this casing having trap doors therein and suitably controlled mechanism, by means of which the trap doors can be so operated as to permit each member of the crew to enter the casing and make his exit from the hull of the submarine in turn.

The novel features of my invention will be fully pointed out in the accompanying drawings and particularly specified in the claims appended hereto.

Reference is to be had to the accompanying drawings forming a part of this specification, in which similar characters of reference indicate corresponding parts in all the views.

Figure 1 is a perspective view of the outside of the casing carried by the submarine, the upper part of the casing being broken away to show parts of the actuating mechanism; Fig. 2 is a vertical longitudinal section through the center of the casing; Fig. 3 is a transverse horizontal section, taken on the line 3—3 of Fig. 2; Fig. 4 is a transverse horizontal section, taken on the line 4—4 of Fig. 2; Fig. 5 is a vertical section, taken through the top part of the casing, showing means for holding the upper trap door in closed position; Fig. 6 is a view similar to Fig. 5, showing the trap door open; Fig. 7 is a vertical section taken through another part of the casing, showing the circuit-controlling means to be operated by a man in the casing, to open the upper trap door; Fig. 8 is a vertical section, on the line 8—8 of Fig. 2; Fig. 9 is a front elevation of a diver's suit used in connection with my improved rescuing apparatus; Fig. 10 is a vertical longitudinal section of the diving suit shown in Fig. 9; Fig. 11 is a detail view of parts shown in Fig. 10, and Fig. 12 is a horizontal section, on the line 12—12 of Fig. 9.

On the drawings, 1 represents the plates of the hull of a submarine, and 2 is an outward projecting casing, having an outer closure or trap door 3 and an inner closure or trap door 4. The casing 2 is cylindrical but it is united to a plate 5 and a pair of plates 6, which form, with the outside surface of the cylindrical casing 2, a pair of chambers 7, as shown on Fig. 4. A curved plate 8, riveted along its edges to the plate 5, forms therewith a longitudinal tapering bay or chamber, as shown in Fig. 1, which serves to inclose and protect a pipe or conduit through which the air is exhausted from the interior of the casing 2 by a pump inside of the hull 1.

The upper trap door 3 is operated by a spindle 9, which spindle has its ends located in bearings in the upper ends of the chambers 7 and carries in each of said chambers a sprocket wheel 10, over which passes an operating chain 11. These sprocket chains pass over sprockets 12 in the hull of the submarine, and 13 is a gear wheel mounted on the same shaft as the sprockets 12, which receive motion from a pinion 14 on the shaft of a motor 15, so that when the motor 15 is operated, the chains 11 turn the spindle 9 and lift the upper trap door, to open the casing.

The motor 15 may be operated by any suitable source of electrical energy, such as a storage battery 16, as shown on Fig. 7. The trap door 3 bears on its outer surface, adjacent the spindle 9, a projecting arm 17, the end of which will engage and depress a rod 18, slidably mounted in the wall of the casing 2 and having an insulated section 19 adjacent its lower end. This insulated section 19 serves to break the circuit of the source 16 to a pair of contacts 21, which are bridged by the metal body of the rod 18 when the motor 15 is to operate.

22 is a switch which serves to open and close the circuit, and 23 are contacts, similar to the contacts 21, these contacts 23 being arranged in a branch circuit, in the manner shown, with the switch 22. This branch circuit comprises conductors 24, which pass up to a conduit 25, constructed on the inside of the casing 2, one of these conductors terminating in a brush 26, which contacts with a disk on spindle 27. This spindle 27 projects through the side of the upper portion of the conduit 25 and has an operating crank or handle 28. On its inner end the shaft 27 carries a contact 29 which, when the shaft is turned, will come in contact with a conductor block 29', so as to complete the circuit from one of the conductors 24 to the other.

30 is an air exhaust pipe located in the longitudinal chamber 8 and communicating with the casing 1 near its upper end. This conduit extends into the hull 1 and communicates at its lower end with an air pump 31, operated by a motor 32. This air pump delivers in a reservoir 33, and 34 is a by-pass joining the reservoir 33 directly to the pipe 30 above the pump, a suitable controlling valve 35 being arranged therein, as shown. The upper end of the pipe 30 contains a valve 36, by means of which the pipe 30 can be closed or opened, this valve 36 being controlled by means of a handle 36' or by means of a rod or spindle 37, which passes down through the bottom of the casing 2 into the hull 1, so as to enable the pipe 30 to be opened by a person outside of the casing when necessary. This rod 37 bears a movable contact 38, which coöperates with a fixed contact 39, to close the circuit of the motor 32. This circuit is not shown on the drawings, but it is so arranged that when the rod 37 is turned to open the valve 36, the motor circuit will be closed, to start the pump operating to exhaust the air from the interior of the casing 2.

40' is a third motor connected by means of a belt gearing or the like to a water pump 42, which communicates with the interior of the casing by means of a pipe or flue 43. The circuit of this motor can be controlled in any desired fashion.

The bottom trap door 4 is held in closed position by means of lateral projections 44 on a number of rods 45, which are mounted inside of the casing 2, so that they can be operated by a person entering the same, to secure the door 4 in closed position.

46 is a cord connected to the door 4, having a counterweight 46' at its other end, so that when a person inside of the casing wishes to close the door 4, the counterweight will assist him in doing so.

The entrance of water to the interior of the casing 2 is controlled by means of a pipe 40 arranged along the outer surface thereof, and having a number of valves 48 therein. The inner end of this pipe is controlled by means of a hand valve 49. The valves 48 may be set in any way desired to regulate the rate of flow through the pipe 40, and the valve 49 being under the control of the occupant of the casing 2, is utilized to turn on or off the inflow of the water. On the inner surface of the casing 2 is also mounted an elongated casing 50, having an opening in its upper end, which is closed by a hollow plug 51. This hollow plug 51 carries a plunger 52, which is mounted in the plug 51 with suitable packing, to prevent water from leaking into the plug 51, and leading from the plug 51 is a suitably insulated cable 53, containing a pair of conductors forming a circuit for a battery 54 and a signal lamp 55. This signal lamp is arranged inside of the hull of the submarine, and the ends of the conductors 53 and the plug 51 are arranged to be pressed together when the plunger 52 is forced inward. This casing 50 and plunger 52 form, with the packing, an ordinary push button switch. Whenever the circuit of the conductor 53 is closed in this way, the lamp 55 will be lighted.

The top or upper trap door 3 is held closed by means of a number of sliding bolts 55' secured to the lower side of the inner surface of this trap door and arranged to engage the lower edge of a flange 56.

57 is a projection which is beneath the flange 56, against which the ends of each of the bolts 55' rest when the bolts are in closed position. These bolts are normally kept in locking position by means of suitable springs, as shown, and their outer ends are connected by rods 58 to a ring 59, so that when the ring 59 is pulled, all of the bolts 55' will be drawn at once. One or more of the bolts 55' will be connected to a battery 60 in a circuit with a number of lamps 61 in the submarine 1, the other terminal of the circuit being connected to one or more of the projections 57. The conductors leading to the bolts 55' and projections 57 will of course be insulated from each other, and the battery 60 and lamps 61 will be of course arranged inside the hull of the vessel. A suitable circuit breaking switch 61' may be included in the circuit of the battery and lamps, as shown.

The diving suits which are employed with the mechanism above described are shown in Figs. 9 to 12 inclusive. 62 is a diver's suit, made preferably of flexible and waterproof material, such as rubber, and having three circumferential chambers 63, 64 and 65. The chamber 63 is to contain oxygen, the chamber 64 air, and the chamber 65 fresh water. The middle chamber 64 is entirely inclosed, to give buoyancy to the suit. Conduits 63' and 65' lead from the chambers 63 and 65 respectively to the head of the suit, so as to make the contents of these chambers available to the person wearing the suit. Access to the chambers 63, 64 and 65 can be obtained without by means of the nipples 63ª, 64ª and 65ª, shown in Fig. 9. These nipples may be provided with screwthreaded caps to close their outer ends after the chambers have been filled. The upper part of the suit 62 is divided longitudinally, and along the edges of the divided part are secured a pair of rigid rods 66. These rods are provided with communicating grooves, and 67 is a block of wood or metal which fits the communicating grooves, to hold the bars 66 tightly together and close the suit after the person wishing to wear it enters the same. The upper part or neck-band of the suit may be provided with a metal collar, which is threaded on the outside, to receive the head piece 69, this head piece being of such size that the wearer can put the same in place over his head after getting into the suit 62. It is provided with the usual sight openings, as shown at 77, and before the head section is put on the wearer binds a suitable strap upon his head, to hold the conduits 63' and 65' in proximity to his lips. 68 are suitable attachments which may be made hollow or may be made of some light material, such as cork, secured to the diver's suit on the shoulders thereof, to increase the buoyancy of the suit, and 73 is a lamp carried by the head piece, which may be caused to light up by means of a battery carried inside of the suit, if desired, so as to enable the person escaping from the boat to be picked up in the dark. In the daytime a small flag or other signal 74 should be employed instead. Referring to Fig. 11, it will be seen that the chamber 63 is provided with a small duct 71', which communicates with the bottom of the duct 63'. This duct may be made of metal, and the part of the diving suit in which are formed the chambers 63, 64 and 65 may also be made of metal, if desired. A spring 72 is used to hold the duct 63' down and normally close the aperture 71'. Whenever the person in the diving suit breathes, he simply pulls up with his teeth the conduit 63', to bring the opening in the side of the duct 63' in register with the opening 71', as shown in Fig. 11.

*Description of operation.*—In case the crew of the submarine are compelled to use the diving apparatus and the casing 2 with the controlling mechanism therefor to escape from the hull, each of them will don a diver's suit and enter the casing 2 in turn. As soon as a man enters the casing 2, he turns the rods 45, to secure the lower trap door 4, and then opens the valve 49, to let the water from the outside pour in. At the same time he will press the plunger 52, which will light up the lamp 55 and give the signal for starting the motor 32. This will be accomplished by another member of the crew turning the rod 37, to bring the contacts 38 and 39 together and thus open the valve 36 and start the motor at the same instant. The air will be drawn out of the casing 2 as fast as the water enters it, and stored in the reservoir 33. When the casing 2 is nearly full, the occupant will pull down upon the ring 59. This will break the circuit through the lamp 61, causing the lamp 61 to go out, thus giving the signal to stop operating the pump 31 and open the trap door 3. The operator inside of the hull 1 now moves the switch 61', to break the circuit of the battery 60, when the water comes in contact with the bolts 55' and projections 57 and closes the switch 22, the contacts 21 being bridged at this time by means of the rod 18. The motor 15 now begins to operate, turning the spindle 9 and opening the door 3, so that the occupant can make his exit therefrom and rise to the surface. When the occupant leaves the casing 2 he keeps hold of the plug 51 with his thumb pressing down on the plunger 52. This keeps the light 55 burning until his body is entirely out of the casing 2, so that he is compelled to let go of the plug 51. The lamp 55 then goes out and the weight 53' then draws the plug 51 back to the casing 50. The operator thus knows that the casing 2 is empty, and to close the trap door 3 it is only necessary to push up on the rod 18. It will be understood that the occupant of the casing 2 turns off the water at the valve 49 before he pulls down the ring 59, and that as soon as the trap door 3 swings up, the arm 17 will depress the rod 18, moving the insulating section between the contacts 21 and break circuit of the motor 15, so that no further power will be applied to move the door 3. After the upper door 3 is closed the water is exhausted from the inside of the casing 2 by means of the pump 42, and by simply opening the valve 35 air can pass from the reservoir 33 back into the casing 2 at this time, it being only necessary to turn the rod 37 to move the contact 38 to a position opposite the circuit-closing position to open the two-way valve 36 for this purpose. After the water is exhausted from the casing, the bottom door 4 can be opened and the next person enter. When all of the crew but one have made their escape in the manner above described, the last man can enter the casing 2, close the bottom door 4 and open the valve 36 by turning the handle 36'. This will operate the rod 37 as before, to set the motor and pump working to withdraw the air, water at the same time entering through the pipe 40. When the casing 2 is nearly full, the occupant turns the handle 36' to close the pipe 30 and stop the motor 32, and after he withdraws the bolts 55 it is only necessary for the inmate to rotate the crank 28, to bring the contact 29 in touch with the contact block 29', and thus close the circuit of the motor 15 around the switch 22 through the conductors 24. The motor 15 will now operate to raise the door 3, and as soon as it swings open to the position shown in Fig. 7, the arm 17 will depress the rod 18, and break the motor circuit, as before. In the case of the last man, it of course will not be necessary to operate the signals 55 and 61, as there will be no one inside of the hull to obey them. All of the apparatus can be controlled from the inside of the casing 2 by this last man, and when he makes his exit the vessel 1 will be abandoned.

It will further be noted that the diver's suit is provided with a pair of webs 75 between the body portion and the arms. These webs may be rolled up, as indicated at the right of Fig. 9, or they may be secured to the sleeves by means of hooks, when the person wearing the suit is swimming, to assist in propelling him forward. The object of this construction is to enable the rescued person to swim after he reaches the surface.

The head-piece or helmet of the diver's suit is provided with a pair of closures 77 for apertures in the front side thereof. These plugs or closures are removable by hand, so that after the wearer of the suit reaches the surface, he can open the helmet to the atmosphere, to breathe outside air before he is picked up.

Referring further to Fig. 2, it will be noted that the lower part of the casing 2 is wider than the part which projects through the hull 1, leaving spaces between the wall and the edges of the trap door 4. This is to give the occupant a foothold when he enters and closes the trap door 4.

A lamp, indicated by the numeral 90, may be used to illuminate the inside of the casing 2, to enable the person about to escape to see what he is doing. This lamp may be of any suitable shape; if desired it may be incased in the wall of the casing 2 and made to illuminate the interior through an aperture provided with a transparent closure.

Having thus described my invention, I claim as new and desire to secure by Letters Patent:

1. Rescuing apparatus for submarine craft, comprising a casing carried by the craft, means for closing the outer end of said casing, mechanism for moving said means to open position to enable the occupant of the casing to make his exit, a signal device inside the submarine vessel, and means carried by the means for closing the outer end of the casing and independent of the mechanism for moving said means to open position, to control said signal.

2. Rescuing apparatus for submarine craft, comprising a casing carried by the hull of the submarine vessel, means mounted on the interior of said casing for actuating an electric signal inside of the hull of the submarine vessel, said means comprising a pair of movable conductors and a button switch therefor, said casing having means for closing its outer end, mechanism for moving said closing means to open position, the movable conductors and the switch enabling the occupant of the casing to indicate his exit from the casing, and a weight for returning the conductors and the switch, to their original positions.

3. Rescuing apparatus for submarine craft, comprising a casing carried by the hull of the submarine vessel, closure means for the inner end of the casing, means operable from the inside of said casing to enable the occupant thereof to secure said means in closing position, means to enable the occupant to admit water to said casing, mechanism for exhausting air simultaneously from said casing, means operable either from within the casing by the occupant thereof or by another person inside of the hull of the submarine craft, to throw said exhausting means into operation, said casing also having closure means for its outer end, mechanism for moving said closure means to open position, and means for enabling either the occupant of the casing or a person inside of the hull of the submarine vessel to throw said last named mechanism into operation, to enable the occupant of the casing to make his exit therefrom.

4. Rescuing apparatus for submarine craft, comprising a casing carried by the hull of the submarine vessel, means for closing the inner end of said casing, means for closing the outer end of said casing, locking mechanism for securing said last-named means in closed position, and a signal device associated with said locking means and actuated thereby, to enable the occupant of the casing to indicate to a person inside of the hull of the submarine the movement of the locking means to unlocking position.

5. Rescuing apparatus for submarine craft, comprising a casing carried by the hull of the submarine vessel, closure means for the inner end of the casing, closure means for the outer end of the casing, means to enable the occupant thereof to admit water to the casing, a conduit communicating at one end with said casing and having a controlling valve adjacent said end and connected to pumping means at its other end for exhausting air from said casing, an electric motor for operating said pumping means, a rod connected to said valve and extending from the interior to the exterior of said casing, switching means controlled by said rod for controlling the supply circuit of the motor, and means carried by said rod to enable the same to be actuated either on the inside or outside of said casing, whereby, when said rod is turned to open the valve, the motor controlling the air pump will be set in operation to exhaust the air from said casing.

6. Rescuing apparatus for submarine craft, comprising a casing carried by the hull of the submarine vessel, closure means for the inner end of the casing, closure means for the outer end of the casing, an electric motor connected to the closure means for the outer end of the casing, to throw the same to open position, a rod carried by said casing and an arm carried by said closure means for the outer end of the casing, to move said arm longitudinally in said casing when the outer closure means has reached the limit of its open position, and means carried by said arm for interrupting the circuit of the motor when the arm has been moved by the means for closing the outer end of the casing, whereby the power of the motor is automatically cut off when the closure means for the outer end of the casing has been moved to open position.

7. Rescuing apparatus for submarine craft, comprising a casing, a valve-controlled conduit connected thereto, pumping means connected to said conduit for exhausting air from said casing, a reservoir connected to said pumping means, and a valve-controlled by-pass connecting the reservoir to the conduit at a point on the suction side of the pump, whereby, when the by-pass is open, the contents of the reservoir can be returned to said casing.

8. Rescuing apparatus for submarine craft, comprising a casing, means for closing the inner end of said casing, means for closing the outer end of said casing, means for moving the last-named means to open position, said means for closing the outer end of the casing having an arm or projection thereon, and a rod mounted movably in said casing in position to be engaged by said projection when the means for closing the outer end of the casing is in open position, whereby the means for closing the outer end of the casing can be returned to closed position by means of said rod.

9. Rescuing apparatus for submarine craft, comprising a casing carried by the hull of the submarine vessel, means for closing the outer end of said casing, locking mechanism for securing said closing means in closed position, said locking means comprising relatively fixed and stationary members, and signal means associated with said locking means, said signal means comprising a circuit having conductors connected to the fixed and stationary members of the locking means, whereby, when the locking means are moved to separate the locking members, to permit the closure means to be opened, the circuit of the signal means will be broken, indicating to persons on the inside of the hull of the submarine that the outer end of the casing is about to be opened.

10. Rescuing apparatus for submarine craft, comprising a casing carried by the hull of the submarine vessel, means for closing the outer end of said casing, mechanism for moving said closing means to open position, a signal located inside the hull of the submarine vessel, flexible means mounted inside of the casing for controlling said signal to enable the occupant of the casing to manipulate the same when he makes his exit therefrom, and means for returning said flexible means to its original position.

11. Rescuing apparatus for submarine craft, comprising a casing carried by the hull of the submarine vessel, closure means for the inner end of the casing, closure means for the outer end of the casing, means to enable an occupant of the casing to admit water thereto, mechanism for exhausting air simultaneously from said casing, means operable either from within the casing by the occupant thereof or by another person inside the hull of the submarine craft, to throw said exhausting means into operation, mechanism for moving the means for closing the outer end of the casing to open position, and means for enabling either the occupant of the casing or a person inside the hull of the submarine vessel to throw said last-named mechanism into operation to enable the occupant of the casing to make his exit therefrom.

In testimony whereof I have signed my name to this specification in the presence of two subscribing witnesses.

SAMUEL ROTH.

Witnesses:
WILLIAM F. NICKEL,
PHILIP D. ROLLHAUS.

It is hereby certified that Letters Patent No. 1,026,458, granted May 14, 1912, upon the application of Samuel Roth, of New York, N. Y., for an improvement in "Submarine Rescuing Apparatus," were erroneously issued to Pieter Treffers, as assignee of the entire interest in said invention, whereas said Letters Patent should have been issued to the inventor, *Samuel Roth and Pieter Treffers, jointly,* said Treffers being assignee of *three-tenths* interest only; and that the said Letters Patent should be read with this correction therein that the same may conform to the record of the case in the Patent Office.

Signed and sealed this 11th day of June, A. D., 1912.

[SEAL.]

C. C. BILLINGS,

*Acting Commissioner of Patents.*